(12) United States Patent
Ramirez et al.

(10) Patent No.: US 8,428,615 B2
(45) Date of Patent: Apr. 23, 2013

(54) METHOD AND DEVICE FOR DETERMINING A POSITION OF A COMMUNICATION APPARATUS

(75) Inventors: Alejandro Ramirez, München (DE); Christian Schwingenschlögl, Putzbrunn (DE)

(73) Assignee: Siemens Aktiengesellschaft, München (DE)

( * ) Notice: Subject to any disclaimer, the term of this patent is extended or adjusted under 35 U.S.C. 154(b) by 609 days.

(21) Appl. No.: 12/542,755

(22) Filed: Aug. 18, 2009

(65) Prior Publication Data

US 2010/0039312 A1 Feb. 18, 2010

(30) Foreign Application Priority Data

Aug. 18, 2008 (DE) .......................... 10 2008 038 246

(51) Int. Cl.
*H04W 24/00* (2009.01)
(52) U.S. Cl.
USPC ............... 455/456.1; 455/456.5; 455/457; 342/22; 342/118; 342/146; 340/539.13; 370/328; 370/338
(58) Field of Classification Search ............... 455/456.1, 455/456.5, 457; 342/22, 146, 118; 370/328, 370/338; 340/539.13
See application file for complete search history.

(56) References Cited

U.S. PATENT DOCUMENTS

| | | | |
|---|---|---|---|
| 5,019,822 A * | 5/1991 | Kirkland | 342/22 |
| 5,760,733 A | 6/1998 | Fournier | |
| 8,010,067 B2 * | 8/2011 | Pyne | 455/127.3 |
| 2007/0285233 A1 | 12/2007 | Inomata et al. | |
| 2008/0153509 A1 * | 6/2008 | Piekarski | 455/456.2 |
| 2010/0295943 A1 * | 11/2010 | Cha et al. | 348/143 |

FOREIGN PATENT DOCUMENTS

| | | |
|---|---|---|
| DE | 69627599 T2 | 11/2003 |
| DE | 202005002477 U1 | 6/2005 |
| DE | 10 2006 045 350 A1 | 3/2007 |
| WO | 02063327 A2 | 8/2002 |

OTHER PUBLICATIONS

Blumenthal et al: "Precise Positioning with a Low Complexity Algorithm in Ad hoc Wireless Sensor Networks", Institute of Applied Microelectronics and Computer Science, University of Rostock, Jun. 1, 2005, pp. 80-85, vol. 28, Nr. 2.
Communication from European Patent Office, Sep. 5, 2011, pp. 1-3, 1-5.
Y.P. Zhang, "Indoor Radiated-Mode Leaky Feeder Propagation at 2.0 GHz", IEEE Transactions on Vehicular Technology, Mar. 2001, pp. 536-545, vol. 50, No. 2.

* cited by examiner

*Primary Examiner* — Amancio Gonzalez

(57) ABSTRACT

A method and a device for determining a position of a communication apparatus is provided. To determine a position of a first apparatus a first signal is transmitted from a second apparatus to the first apparatus. A second signal is then transmitted from the first apparatus to the second apparatus as a response to the first signal, the first signal and the second signal being transmitted by way of at least two different mediums. Signal strength of the second signal received by the second apparatus and a transfer time from a first time of transmission of the first signal to a second time of receipt of the second signal are measured. The position of the first apparatus is finally calculated as a function of the measured signal strength of the received second signal and the measured transfer time.

19 Claims, 5 Drawing Sheets

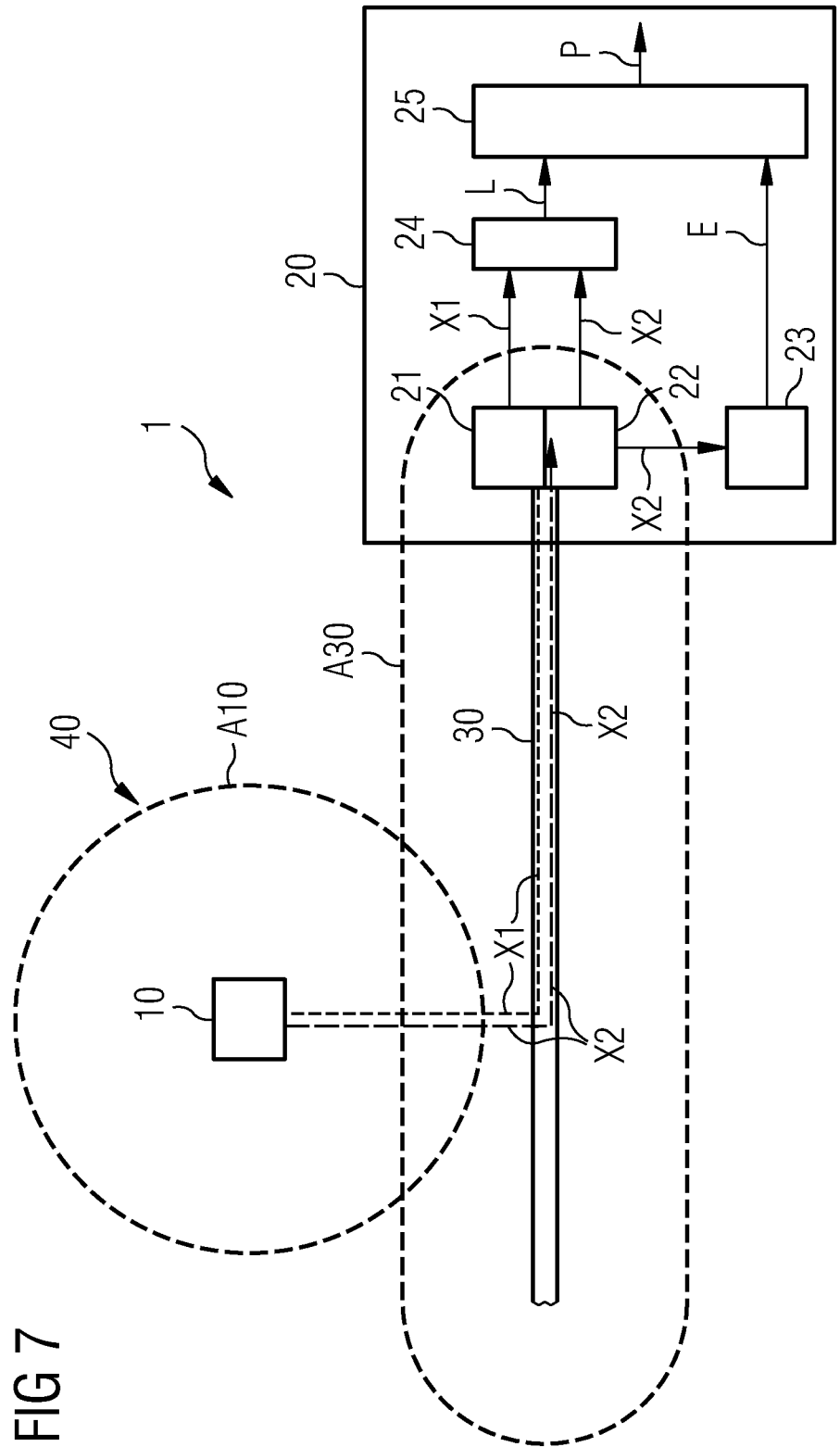

METHOD AND DEVICE FOR DETERMINING A POSITION OF A COMMUNICATION APPARATUS

CROSS REFERENCE TO RELATED APPLICATIONS

This application claims priority of German Patent Application No. 10 2008 038 246.9 DE filed Aug. 18, 2008, which is incorporated by reference herein in its entirety.

FIELD OF INVENTION

The invention relates to a method and a device for determining a position of a communication apparatus.

BACKGROUND OF INVENTION

The technical field of the invention relates to determining the position or location of a communication apparatus or an apparatus such as a wireless communication device, mobile radio device, MDA or PDA for example.

Solutions are known internally to the applicant for determining a one-dimensional position of a communication apparatus. These calculate the distance between the communication apparatus and a fixed base station, with the signals for determining the position being exchanged between the communication apparatus and the base station by way of a radiating cable and by way of air and the distance between the communication apparatus and the radiating cable being constant. An example of such a constant distance between the radiating cable and the communication apparatus is present when the communication apparatus is integrated in a train or the like and the radiating cable is laid parallel to the tracks.

SUMMARY OF INVENTION

However until now solutions have disadvantageously only been known for one-dimensional position determination, not for two-dimensional position determination with a variable distance between the radiating cable and the communication apparatus, the position of which is to be determined.

Therefore one object of the present invention is to create a two-dimensional position determination for an apparatus.

According to the invention this object is achieved by a method and by a device as claimed in the claims.

A method is thus proposed for determining a position of a first apparatus, having the following steps:
a) transmitting a first signal from a second apparatus to the first apparatus;
b) transmitting a second signal from the first apparatus to the second apparatus as a response to the first signal received by the first apparatus, with the first signal and the second signal being transmitted by way of at least two different mediums;
c) measuring the signal strength of the second signal received by the second apparatus;
d) measuring the transfer time from a first time of transmission of the first signal to a second time of receipt of the second signal; and
e) calculating the position of the first apparatus as a function of the measured signal strength of the received second signal and the measured transfer time.

A computer program product is also proposed, which on a program-controlled facility prompts the above steps a) to e) of the method for determining a position of a first apparatus to be performed.

A computer program product like a computer program means can be provided or supplied for example as a storage medium, such as a memory card, USB stick, floppy, CD-ROM, DVD or even in the form of a file that can be downloaded from a server in a network. This can be done for example in a wireless communication network by transferring a corresponding file containing the computer program product or the computer program means.

A device for determining a position of a first apparatus is also proposed, having:
a) a transmit means, which is set up to transmit a first signal to the first apparatus, the first signal being suitable to initiate transmission of a second signal from the first apparatus receiving the first signal, with the first signal and the second signal being transmitted by way of at least two different mediums;
b) a receive means, which is set up to receive the second signal sent by the first apparatus;
c) a first measuring means, which is set up to measure the signal strength of the received second signal;
d) a second measuring means, which is set up to measure the transfer time from a first time of transmission of the first signals to a second time of receipt of the second signal; and
e) a calculating means, which is set up to calculate the position of the first apparatus as a function of the measured signal strength of the received second signal and the measured transfer time.

An arrangement is also proposed, having:
a device as described above to determine a position of a first apparatus; and
a number N; $N \geq 1$; of first apparatuses, with the respective first apparatus being set up to transmit the second signal to the device as a response to the first signal sent by the device.

One advantage of the present invention is that it enables a two-dimensional position determination or location determination of the first apparatus relative to the position of the second apparatus.

According to the invention the two-dimensional position determination is enabled by the following:

By measuring the signal strength of the second signal received by the second apparatus it is possible to provide a first curve of possible positions of the first apparatus in an X-Y plane, where X shows the horizontal distance between the first apparatus and the second apparatus and Y the vertical distance between the first apparatus and the second apparatus.

By measuring the transfer time between transmission of the first signal and receipt of the second signal it is possible to provide a second curve of possible positions of the first apparatus in the X-Y plane.

The point of intersection of the first curve with the second curve also corresponds to the position of the first apparatus relative to the second apparatus.

Although it is theoretically possible for there to be two or more points of intersection between the first curve and the second curve, the actual position of the first apparatus can also be determined by means of a plausibility check due to the linear dependency between the transfer time and the distance between the first apparatus and the second apparatus.

One possibility for the embodiment of step c) of the inventive method, namely measuring the signal strength of the second signal received by the second apparatus, is described in "Indoor Radiated-Mode Leaky Feeder Propagation at 2.0 GHz", Y. P. Zhang, IEEE Transactions on Vehicular Technology, vol. 50, no. 2, March 2001.

One possibility for the embodiment of step d), namely measuring the transfer time between transmission of the first signal to receipt of the second signal, is also described in DE 10 2006 045 350 A1.

Advantageous embodiments and developments of the invention will emerge from the dependent claims and the description with reference to the drawings.

According to one preferred development the first signal and the second signal are at least in part transmitted wirelessly.

According to a further preferred development the at least two different mediums bring about a different signal transfer time and a different signal attenuation.

According to a further preferred development the at least two different mediums are embodied as a radiating cable and air,
a radiating cable and water,
a glass fiber cable and air,
a glass fiber cable and water,
a polymer fiber cable and air or
a polymer fiber cable and water.

Any further combination of two different mediums is possible, as long as it is ensured that the two different mediums bring about a different signal transfer time and a different signal attenuation.

According to a further preferred development before step a) is performed a calibration is performed at a known reference position of the first apparatus to determine a reference transfer time and a reference signal strength of the second signal received by the second apparatus.

According to a further preferred development the reference transfer time from the first time of transmission of the first signal to the second time of receipt of the second signal and the reference signal strength of the second signal received by the second apparatus are measured by the second apparatus, with the reference position of the first apparatus and/or the second apparatus being known.

According to a further preferred development the position of the first apparatus is calculated as a function of the signal strength measured by the second apparatus, the transfer time measured by the second apparatus, the known reference position of the first apparatus, the measured reference transfer time and the measured reference signal strength of the received second signal.

According to a further preferred development the position of the first apparatus is calculated by the second apparatus as a function of the measured signal strength of the received second signal, the measured transfer time, a delay time known to the second apparatus between a third time of receipt of the first signal by the first apparatus and a fourth time of transmission of the second signal by the first apparatus and a transmit power of the second signal known to the second apparatus.

According to a further preferred development the second signal is embodied with a data field, which contains delay time information, which indicates the respective delay time, which corresponds to the respective difference between the fourth time and the third time.

According to a further preferred development a third signal is transmitted from the first apparatus to the second apparatus before or after the first signal, having a data field, which contains delay information, which indicates the respective delay time, which corresponds to the respective difference between the fourth time and the third time.

The third signal also preferably contains a further data field, which contains transmit power information, which indicates the respective transmit power of the first apparatus. The further data field can also be transmitted by means of a fourth signal from the first apparatus to the second apparatus.

According to a further preferred development before step a) is performed at least one calibration step is performed to determine the delay time between the third time and the fourth time. The determined delay time can then be stored in the second apparatus before step a) is performed.

According to a further preferred development the first apparatus is embodied as a mobile apparatus and/or the second apparatus is embodied as a fixed apparatus.

If the second apparatus is a fixed apparatus and its absolute position is therefore known, it is also possible to calculate the absolute position of the first apparatus from the inventively calculated relative position of the first apparatus to the second apparatus and the known absolute position of the second apparatus.

According to a further preferred development the first apparatus is embodied as a fixed apparatus and the second apparatus is embodied as a mobile apparatus.

According to a further preferred development the first apparatus is embodied as a mobile, wireless communication facility, in particular as a mobile radio device, notebook, PDA or MDA.

According to one preferred embodiment the device has a timer means, which measures the difference between the second time and the first time.

According to a further preferred embodiment the first signal is embodied with at least one address field, the respective address field containing an address of a first apparatus as recipient of the first signal.

According to a further preferred embodiment the device has a channel coding means, which is set up to code the first signal in such a manner that it can only be decoded by a predeterminable set of the number N of first apparatuses.

BRIEF DESCRIPTION OF THE DRAWINGS

The invention is described in more detail below with reference to the exemplary embodiments indicated in the schematic figures, in which:

FIG. 7 shows a schematic block diagram of an exemplary embodiment of an arrangement with the inventive device for determining a position of a first apparatus.

Unless otherwise specified, identical or functionally identical means and facilities are shown with the same reference characters in all the figures.

DETAILED DESCRIPTION OF INVENTION

Figure 1:
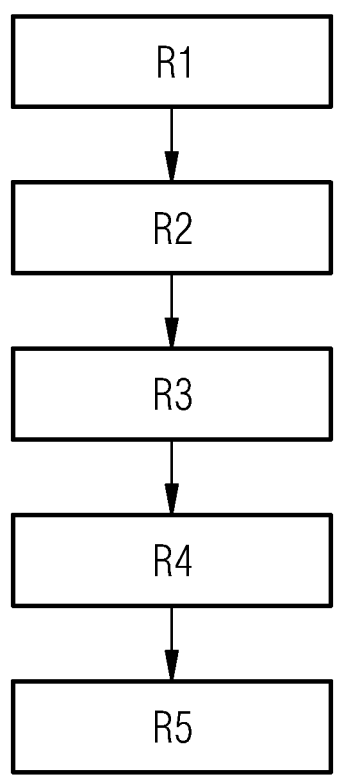
FIG. 1 shows a schematic flow diagram of a first exemplary embodiment of the inventive method for determining a position of a first apparatus.

FIG. 1 shows a schematic flow diagram of a first exemplary embodiment of the inventive method for determining a position P of a first apparatus 10.

The inventive method is described below based on the block diagram in FIG. 1 with reference to FIGS. 2, 3, 6 and 7. The exemplary embodiment of the inventive method according to FIG. 1 has the method steps R1 to R5:

Method Step R1:

A first signal X1 is transmitted from a second apparatus 20 to the first apparatus 10.

The first apparatus 10 is a mobile apparatus for example. This can be embodied as a mobile, wireless communication facility, in particular as a mobile radio device, notebook, PDA or MDA. The second apparatus 20 is a fixed apparatus such as a base station for example.

Method Step R2:

As a response to the first signal X1 received by the first apparatus 10, a second signal X2 is transmitted from the first apparatus 10 to the second apparatus 20. The first signal X1 and the second signal X2 are transmitted by way of at least two different mediums 30, 40.

The first signal X1 and second signal X2 here are at least in part transmitted wirelessly. The at least two different mediums 30, 40 bring about a different signal transfer time and a different signal attenuation of the first and second signal X1, X2.

The at least two different mediums 30, 40 are for example embodied as a radiating cable and air, a radiating cable and water, a glass fiber cable and air, a glass fiber cable and water, a polymer fiber cable and air or a polymer fiber cable and water.

A radiating cable is known for example from DE 69627599 T2. Such radiating cables are also known as leaky wave cables and leaky coaxes.

Figure 2:
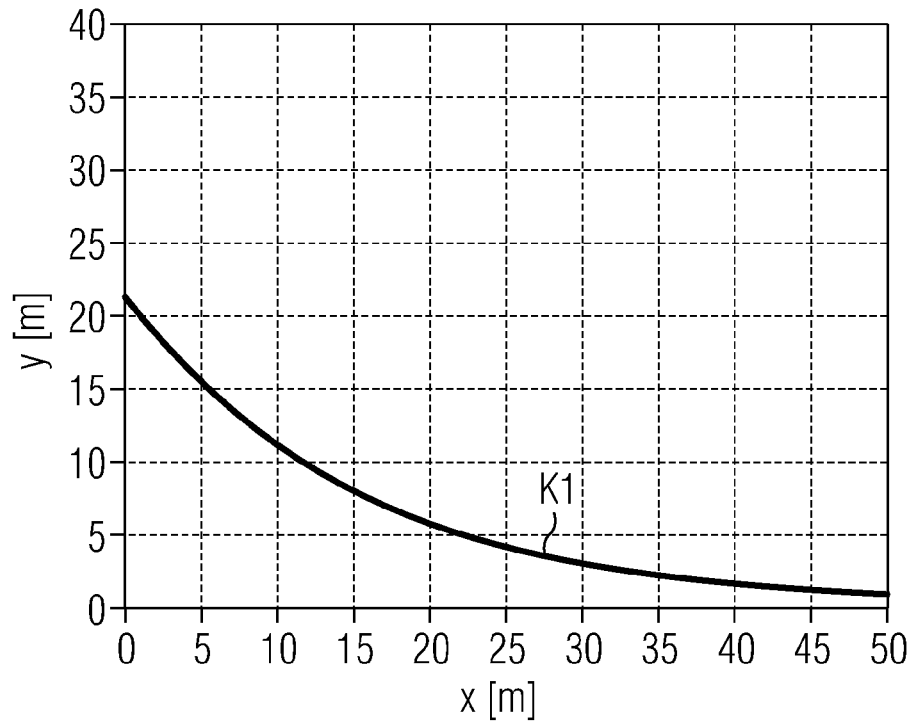
FIG. 2 shows an exemplary X-Y diagram to illustrate a curve of possible positions of the apparatus as a function of the measured signal strength.
Figure 3:
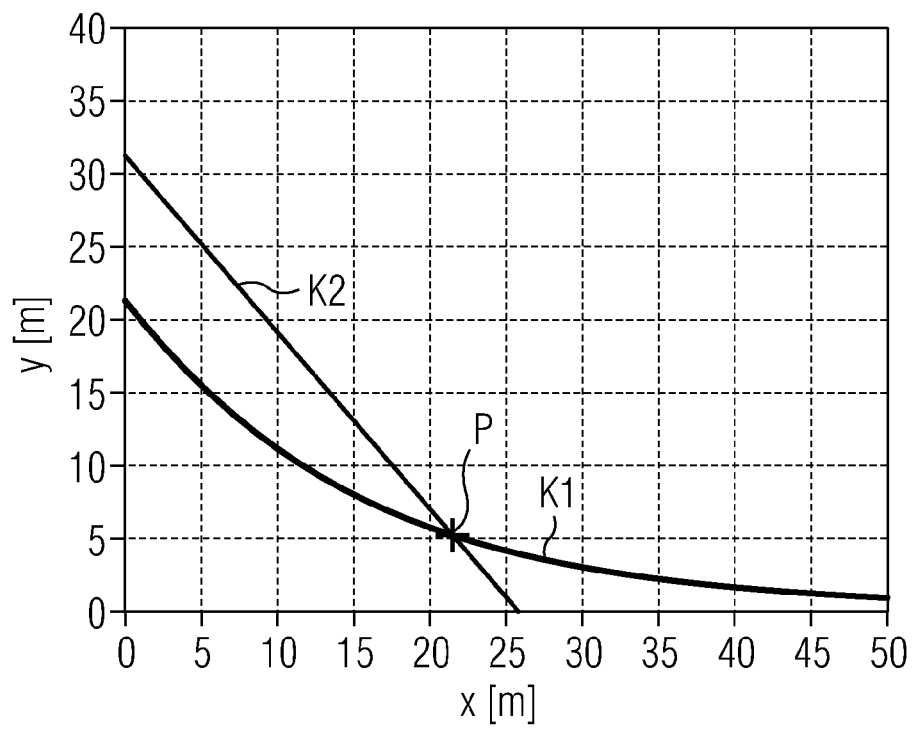
FIG. 3 shows an exemplary X-Y diagram to illustrate the position of the apparatus as a function of the measured signal strength and the measured transfer time.

Method Step R3:

The signal strength E of the second signal X2 received by the second apparatus 20 is measured. To this end FIG. 2 shows an exemplary X-Y diagram to illustrate a first curve K1 of possible positions of the first apparatus 10 as a function of the measured signal strength E.

Figure 6:
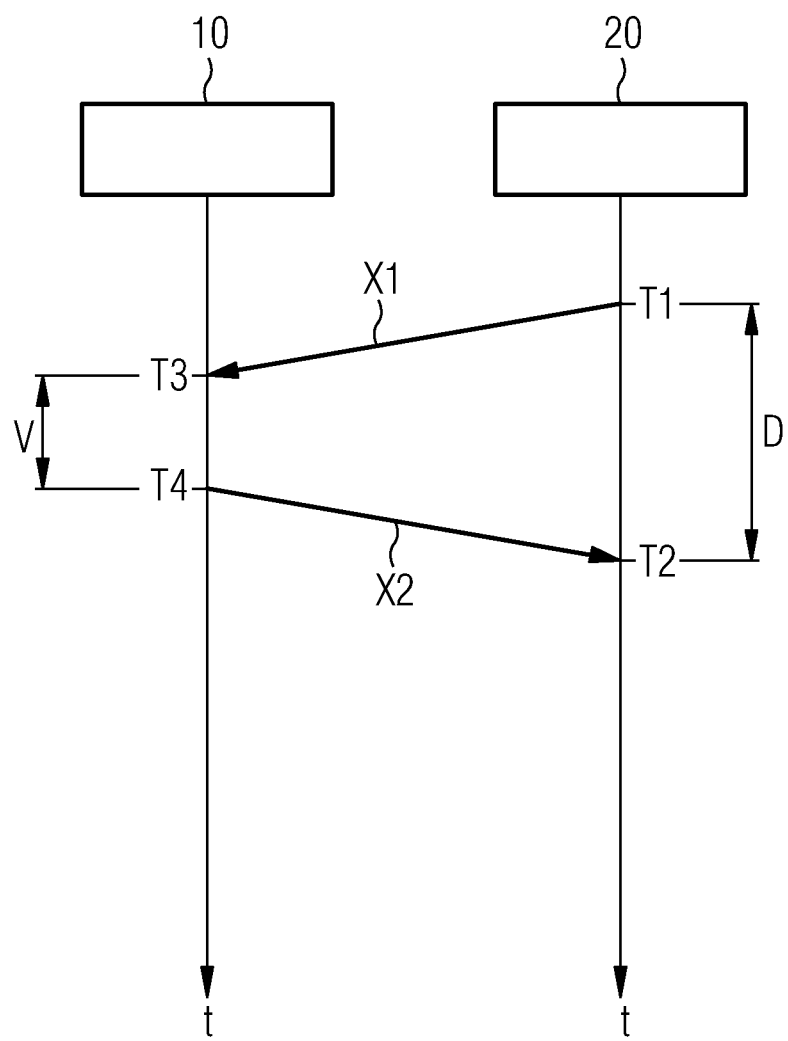
FIG. 6 shows a schematic block diagram of an exemplary embodiment of the signal pattern of the first and second signal according to the invention.

Method Step R4:

The transfer time D between a first time T1 of transmission of the first signal X1 to a second time T2 of receipt of the second signal X2 is measured. To this end FIG. 6 shows a schematic block diagram of an exemplary embodiment of the signal pattern of the first and second signal X1, X2 and the resulting transfer time D between times T1 and T2. In addition to the first curve K1 according to FIG. 2 FIG. 3 also shows a second curve K2 of possible positions of the first apparatus 10 as a function of the measured transfer time D.

Method Step R5:

The position P of the first apparatus 10 is calculated as a function of the measured signal strength E of the received second signal X2 and the measured transfer time D. The position P with reference to FIG. 3 thus results for example as the point of intersection P between the first curve K1 and the second curve K2.

Figure 4:
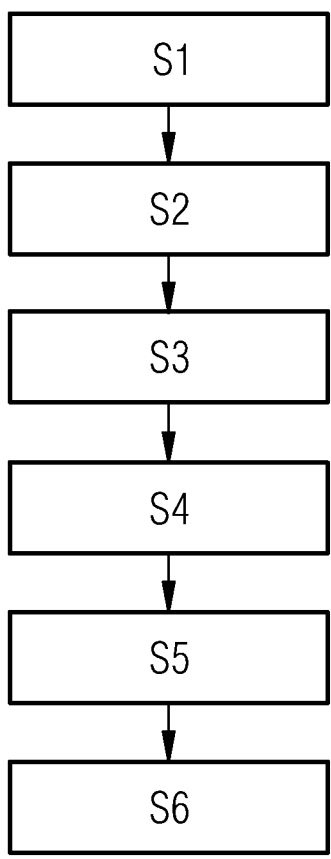
FIG. 4 shows a schematic flow diagram of a second exemplary embodiment of the inventive method for determining a position of a first apparatus.

FIG. 4 shows a schematic flow diagram of a second exemplary embodiment of the inventive method for determining a position P of the first apparatus 10.

The second exemplary embodiment of the inventive method according to FIG. 4 has method steps S1 to S6, with method steps S2 to S5 corresponding to method steps R1 to R4 in FIG. 1. Method steps S2 to S5 are therefore not described in further detail below but reference should be made for these to method steps R1 to R4 in FIG. 1.

Method Step S1:

A calibration is performed at a known reference position of the first apparatus 10 to determine a reference transfer time and a reference signal strength of the second signal X2 received by the second apparatus 20. In this process the reference transfer time from the first time T1 of transmission of the first signal X1 to the second time T2 of receipt of the second signal X2 is measured. The reference signal strength of the second signal X2 received by the second apparatus 20 is also measured by the second apparatus 20. As described above, the calibration requires the second apparatus 20 to know the reference position of the first apparatus 10.

Method Steps S2 to S5:

Method steps S2 to S5 correspond to method steps R1 to R4 described with reference to FIG. 1.

Method Step S6:

The position P of the first apparatus 10 is calculated as a function of the signal strength E measured by the second apparatus 20, the transfer time D measured by the second apparatus 20, the known reference position of the first apparatus 10, the measured reference transfer time and the measured reference signal strength of the received second signal X2.

Figure 5:
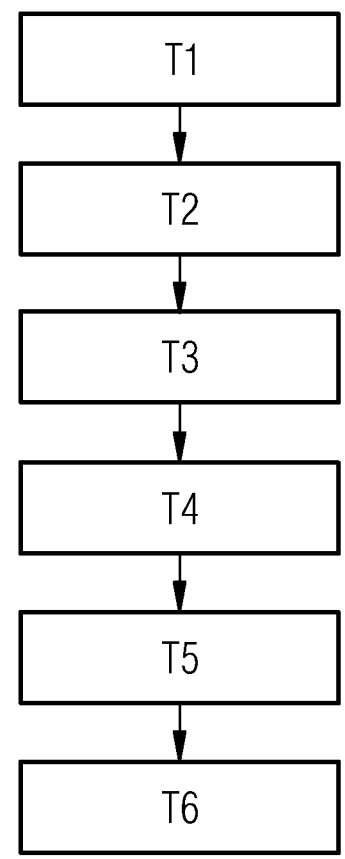
FIG. 5 shows a schematic flow diagram of a third exemplary embodiment of the inventive method for determining a position of a first apparatus.

FIG. 5 shows a schematic flow diagram of a third exemplary embodiment of the inventive method for determining the position P of the first apparatus 10.

The third exemplary embodiment of the inventive method is described below based on the block diagram in FIG. 5 with reference to FIGS. 6 and 7.

The third exemplary embodiment of the inventive method has the method steps T1 to T6:

Method Step T1:

At least one calibration step is performed to determine a delay time V between a third time T3 of receipt of the first signal X1 by the first apparatus 10 and a fourth time T4 of transmission of the second signal X2 by the first apparatus 10. The delay time V determined by the at least one calibration step is stored in the second apparatus 20. To this end the second apparatus 20 can have a storage apparatus. The delay time V is the time taken by the first apparatus 10 to generate and send the second signal X2 after receipt of the first signal X1 has been ascertained.

Method Step T2:

After the calibration performed according to the above method step T1 it is possible to determine an unknown position P of the first apparatus. To this end a first signal X1 is transmitted from the second apparatus 20 to the first apparatus 10, which is in the currently unknown position P.

Method Step T3:

As a response to the first signal X1 received by the first apparatus 10 a second signal X2 is sent from the first apparatus 10 to the second apparatus 20, with the first signal X1 and the second signal X2 being transmitted by way of at least two different mediums 30, 40.

The second signal X2 here can be embodied with a data field, which contains delay time information, which indicates the respective delay time V, which corresponds to the respective difference between the fourth time T4 and the third time T3. In such an instance, where the second signal X2 is embodied with such a data field, method step T1 could be omitted.

As an alternative to the embodiment of the second signal X2 with a data field containing delay time information a third signal S3 can also be transmitted from the first apparatus 10 to the second apparatus 20 before or after the second signal X2. The third signal S3 here preferably has a data field, which contains delay information, which indicates the respective delay time V, which corresponds to the respective difference between the fourth time T4 and the third time T3.

Method Step T4:

The signal strength E of the second signal X2 received by the second apparatus 20 is measured.

Method Step T5:

The transfer time D from the first time T1 of transmission of the first signal X1 to the second time T2 of receipt of the second signal X2 is measured.

Method Step T6:

The position P of the first apparatus 10 is calculated by the second apparatus 20 as a function of the measured signal strength E of the received second signal X2, the measured transfer time D, the delay time V known to the second apparatus 20 and a transmit power S of the second signal X2 known to the second apparatus 20.

FIG. 7 shows a schematic block diagram of an exemplary embodiment of an arrangement 1 with the inventive device 20 for determining a position P of a first apparatus 10.

Without loss of generality in FIG. 7 the two different mediums 30, 40 are embodied as a radiating cable 30 and air 40.

In FIG. 7 the reference character A10 identifies the antenna field of the first apparatus 10 and the reference character A30 identifies the antenna field of the radiating cable 30.

A communication connection between the first apparatus 10 and the device 20 is embodied by the antenna fields A10 and A30.

The reference characters X1 and X2 also schematically illustrate the signal patterns of the first signal X1 and the second signal X2 in FIG. 7.

The device 20 is suitable for determining the position P of the first apparatus 10 and to this end has a transmit means 21, a receive means 22, a first measuring means 23, a second measuring means 24 and a calculating means 25.

The transmit means 21 is set up to transmit a first signal X1 to the first apparatus 10, with the first signal X1 being suitable to initiate transmission of a second signal X2 from the first apparatus 10 receiving the first signal X1. The first signal X1 and second signal X2 here are transmitted by way of at least two different mediums 30, 40. As shown in FIG. 7, first signal X1 initiates at the second apparatus 20, travels first through a first medium 30 and then through a second medium 40 before reaching first apparatus 10, where the first medium 30 and the second medium 40 form a transmit path. The first apparatus 10 then initiates the second signal X2 which then returns along the same transmit path to the second apparatus 20. Thus, the transmit path includes two different mediums and the first signal X1 and the second signal X2 travel the same transmit path between the first apparatus 10 and the second apparatus 20.

The receive means 22 is also set up to receive the second signal X2 sent from the first apparatus 10.

The first measuring means 23 is also set up to measure the signal strength E of the received second signal X2.

The second measuring means 24 is also set up to measure the transfer time D from the first time T1 of transmission of the first signal X1 to the second time T2 of receipt of the second signal X2 (see FIG. 6).

The second measuring means 24 is embodied for example as a timer.

The calculating means 25 is also set up to calculate the position P of the first apparatus 10 as a function of the measured signal strength E of the received second signal X2 and the measured transfer time D.

Without loss of generality only one first apparatus 10 is shown in FIG. 7. However it is possible to use the device 20 to determine the respective position of a number N; N≧1; of first apparatuses 10. The respective first apparatus 10 is then set up to transmit the second signal X2 to the device 20 as a response to the first signal X1 sent by the device 20. The first signal X1 can then be embodied for example with at least one address field, the respective address field containing an address of a first apparatus 10 as recipient of the first signal X1.

Alternatively or additionally the device 20 can have a channel coding means (not shown), which is set up to code the first signal X1 in such a manner that it can only be decoded by a predetermined set, for example just one, of the number N of first apparatuses 10.

Although the present invention was described above based on preferred exemplary embodiments, it is not restricted to these but can be modified in a diverse manner.

The invention claimed is:

1. A method for determining a position of a first apparatus, comprising:
    transmitting a first signal from a second apparatus to the first apparatus;
    transmitting a second signal from the first apparatus to the second apparatus as a response to the first signal received by the first apparatus, the first signal and the second signal each being transmitted by way of a transmit path wherein the transmit path comprises two different mediums;
    measuring a signal strength of the second signal received by the second apparatus;
    measuring a transfer time from a first time of transmission of the first signal to a second time of receipt of the second signal; and
    calculating the position of the first apparatus as being a first possible position of the first apparatus as determined as a function of the measured signal strength of the received second signal when the first possible position as determined as a function of the measured signal strength is the same as a second possible position of the first apparatus as determined separately as a function of the measured transfer time of the received second signal.

2. The method as claimed in claim 1, wherein the first signal and the second signal are at least in part transmitted wirelessly.

3. The method as claimed in claim 1, wherein the two different mediums cause a different signal transfer time and a different signal attenuation.

4. The method as claimed in claim 1, wherein the two different mediums are selected from a group consisting of
    a radiating cable and air,
    a radiating cable and water,
    a glass fiber cable and air,
    a glass fiber cable and water,
    a polymer fiber cable and air, and
    a polymer fiber cable and water.

5. The method as claimed in claim 1, further comprising:
    calibrating at a known reference position of the first apparatus to determine a reference transfer time and a reference signal strength of the second signal received by the second apparatus.

6. The method as claimed in claim 5, wherein the calibrating is performed as first method step before transmitting the first signal from the second apparatus to the first apparatus.

7. The method as claimed in claim 5, wherein the reference transfer time from the first time of transmission of the first signal to the second time of receipt of the second signal and the reference signal strength of the second signal received by the second apparatus are measured by the second apparatus, the reference position of the first apparatus being known to the second apparatus.

8. The method as claimed in claim 5, wherein the position of the first apparatus is calculated as a function of
    the signal strength measured by the second apparatus, the transfer time measured by the second apparatus,
the known reference position of the first apparatus,
the measured reference transfer time, and
the measured reference signal strength of the received second signal.

9. The method as claimed in claim 1, wherein the position of the first apparatus is calculated by the second apparatus as a function of
the measured signal strength of the received second signal,
the measured transfer time,
a delay time known to the second apparatus between a third time of receipt of the first signal by the first apparatus and a fourth time of transmission of the second signal by the first apparatus, and
a transmit power of the second signal known to the second apparatus.

10. The method as claimed in claim 9, wherein the second signal includes a data field containing delay time information, which indicates the respective delay time, which corresponds to the respective difference between the fourth time and the third time.

11. The method as claimed in claim 9, wherein a third signal is transmitted from the first apparatus to the second apparatus before or after the first signal, including a data field containing delay information, which indicates the respective delay time, which corresponds to the respective difference between the fourth time and the third time.

12. The method as claimed in claim 9, further comprising:
calibrating to determine the delay time between the third time and the fourth time; and
storing the determined delay time in the second apparatus.

13. The method as claimed in claim 12, wherein the calibrating is performed as first method step before transmitting the first signal from the second apparatus to the first apparatus.

14. The method as claimed in claim 1, wherein the first apparatus is a mobile apparatus and the second apparatus is a fixed apparatus.

15. The method as claimed in claim 14, wherein the first apparatus is a mobile, wireless communication device, in particular a mobile radio device, notebook, PDA or MDA.

16. The method as claimed in claim 1, wherein at least one of the two different mediums comprises a radiating cable, and wherein as the position of the first apparatus changes along a length of the radiating cable, a signal attenuation caused by the radiating cable changes.

17. A computer readable medium comprising a non-transitory readable medium storing a computer program, which on a program-controlled device performs a method for determining a position of a first apparatus, the method comprising:
transmitting a first signal from a second apparatus to the first apparatus;
transmitting a second signal from the first apparatus to the second apparatus as a response to the first signal received by the first apparatus;
measuring a signal strength of the second signal received by the second apparatus;
measuring a transfer time from a first time of transmission of the first signal to a second time of receipt of the second signal; and
calculating the position of the first apparatus as being a first possible position of the first apparatus as determined as a function of the measured signal strength of the received second signal when the first possible position as determined as a function of the measured signal strength is the same as a second possible position of the first apparatus as determined separately as a function of the measured transfer time of the received second signal.

18. A device for determining a position of a first apparatus, comprising:
a transmit means configured to transmit a first signal to the first apparatus, the first signal being suitable to initiate transmission of a second signal from the first apparatus receiving the first signal;
a receive means configured to receive the second signal sent by the first apparatus;
a first measuring means configured to measure the signal strength of the received second signal;
a second measuring means configured to measure a transfer time from a first time of transmission of the first signals to a second time of receipt of the second signal; and
a calculating means configured to calculate the position of the first apparatus as being a first possible position of the first apparatus as determined as a function of the measured signal strength of the received second signal when the first possible position as determined as a function of the measured signal strength is the same as a second possible position of the first apparatus as determined separately as a function of the measured transfer time of the received second signal.

19. The device as claimed in claim 18, further comprising:
a timer configured to measures the difference between the second time and the first time.

* * * * *